(12) United States Patent
Puthoor et al.

(10) Patent No.: US 12,399,719 B2
(45) Date of Patent: Aug. 26, 2025

(54) RESOURCE ACCESS CONTROL

(71) Applicant: Advanced Micro Devices, Inc., Santa Clara, CA (US)

(72) Inventors: Sooraj Puthoor, Austin, TX (US); Nuwan S Jayasena, Cupertino, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 102 days.

(21) Appl. No.: 18/147,103

(22) Filed: Dec. 28, 2022

(65) Prior Publication Data

US 2024/0220265 A1 Jul. 4, 2024

(51) Int. Cl.
*G06F 9/50* (2006.01)
*G06F 9/38* (2018.01)
*G06F 9/48* (2006.01)

(52) U.S. Cl.
CPC .......... *G06F 9/3836* (2013.01); *G06F 9/4806* (2013.01); *G06F 9/5061* (2013.01)

(58) Field of Classification Search
None
See application file for complete search history.

(56) References Cited

U.S. PATENT DOCUMENTS

| | | | | |
|---|---|---|---|---|
| 6,226,749 | B1 * | 5/2001 | Carloganu | G06F 21/606 726/2 |
| 7,296,271 | B1 | 11/2007 | Chalmer | |
| 9,065,740 | B2 * | 6/2015 | Mopur | G06F 3/067 |
| 10,762,245 | B2 * | 9/2020 | Roper | G06F 21/83 |
| 11,706,784 | B2 * | 7/2023 | Yu | H04W 72/23 370/329 |
| 11,934,698 | B2 | 3/2024 | Puthoor et al. | |
| 2009/0307699 | A1 * | 12/2009 | Munshi | G06F 9/44 718/102 |
| 2012/0167062 | A1 * | 6/2012 | Levanoni | G06F 9/455 717/136 |
| 2016/0026667 | A1 | 1/2016 | Mukherjee | |
| 2016/0328310 | A1 * | 11/2016 | Bhandari | G06F 8/658 |
| 2020/0110665 | A1 * | 4/2020 | Salgaonkar | G06F 11/0751 |
| 2020/0127973 | A1 * | 4/2020 | Akyol | G05B 9/02 |
| 2021/0117246 | A1 * | 4/2021 | Lal | G06F 9/3814 |
| 2021/0271599 | A1 | 9/2021 | Sharovar | |
| 2023/0195375 | A1 | 6/2023 | Puthoor et al. | |

(Continued)

OTHER PUBLICATIONS

Puthoor, Sooraj, et al., "US Application as Filed", U.S. Appl. No. 17/556,503, filed Dec. 20, 2021, 37 pages.

(Continued)

*Primary Examiner* — Hyun Nam
(74) *Attorney, Agent, or Firm* — FIG. 1 Patents

(57) ABSTRACT

Resource access control is described. In accordance with the described techniques, a process (e.g., an application process, a system process, etc.) issues an instruction seeking access to a computation resource (e.g., a processor resource, a memory resource, etc.) to perform a computation task. An execution context for the instruction is checked to determine whether the execution context includes a resource indicator indicating permission to access the processor resource. Alternatively or additionally, the instruction is checked against an access table which identifies processes that are permitted and/or not permitted to access the computation resource.

20 Claims, 4 Drawing Sheets

(56) References Cited

U.S. PATENT DOCUMENTS

| | | | |
|---|---|---|---|
| 2023/0395184 A1* | 12/2023 | Caraccio | G11C 29/52 |
| 2024/0061758 A1* | 2/2024 | Schaefer | G06F 9/5044 |
| 2024/0220164 A1 | 7/2024 | Puthoor et al. | |
| 2024/0220265 A1* | 7/2024 | Puthoor | G06F 9/4806 |
| 2025/0013512 A1* | 1/2025 | Sarkar | G06F 9/5055 |
| 2025/0123814 A1* | 4/2025 | McMorran | G06F 8/75 |

OTHER PUBLICATIONS

U.S. Appl. No. 17/556,503, "Notice of Allowance", U.S. Appl. No. 17/556,503, filed Aug. 9, 2023, 7 pages.

U.S. Appl. No. 17/556,503, "Notice of Allowance", U.S. Appl. No. 17/556,503, filed Nov. 29, 2023, 7 pages.

"Notice of Allowance", U.S. Appl. No. 18/604,585, filed Apr. 23, 2025, 8 pages.

* cited by examiner

400

402
Compare an identifier for an instruction to an access table

404
Process the instruction based at least in part on whether the identifier for the instruction matches an entry in the access table for access to a computation resource

RESOURCE ACCESS CONTROL

BACKGROUND

System resources such as processing components (e.g., a processing unit such as a central processing unit (CPU)) and data storage components enable various computer-related tasks to be performed, such as data processing tasks, data storage tasks, and so forth. Further, some systems provide for processing components and data storage components situated at various locations, such as in-memory processing components that perform data storage and processing in the context of a computer memory.

BRIEF DESCRIPTION OF THE DRAWINGS

The detailed description is described with reference to the accompanying figures.

DETAILED DESCRIPTION

Overview

Figure 1:
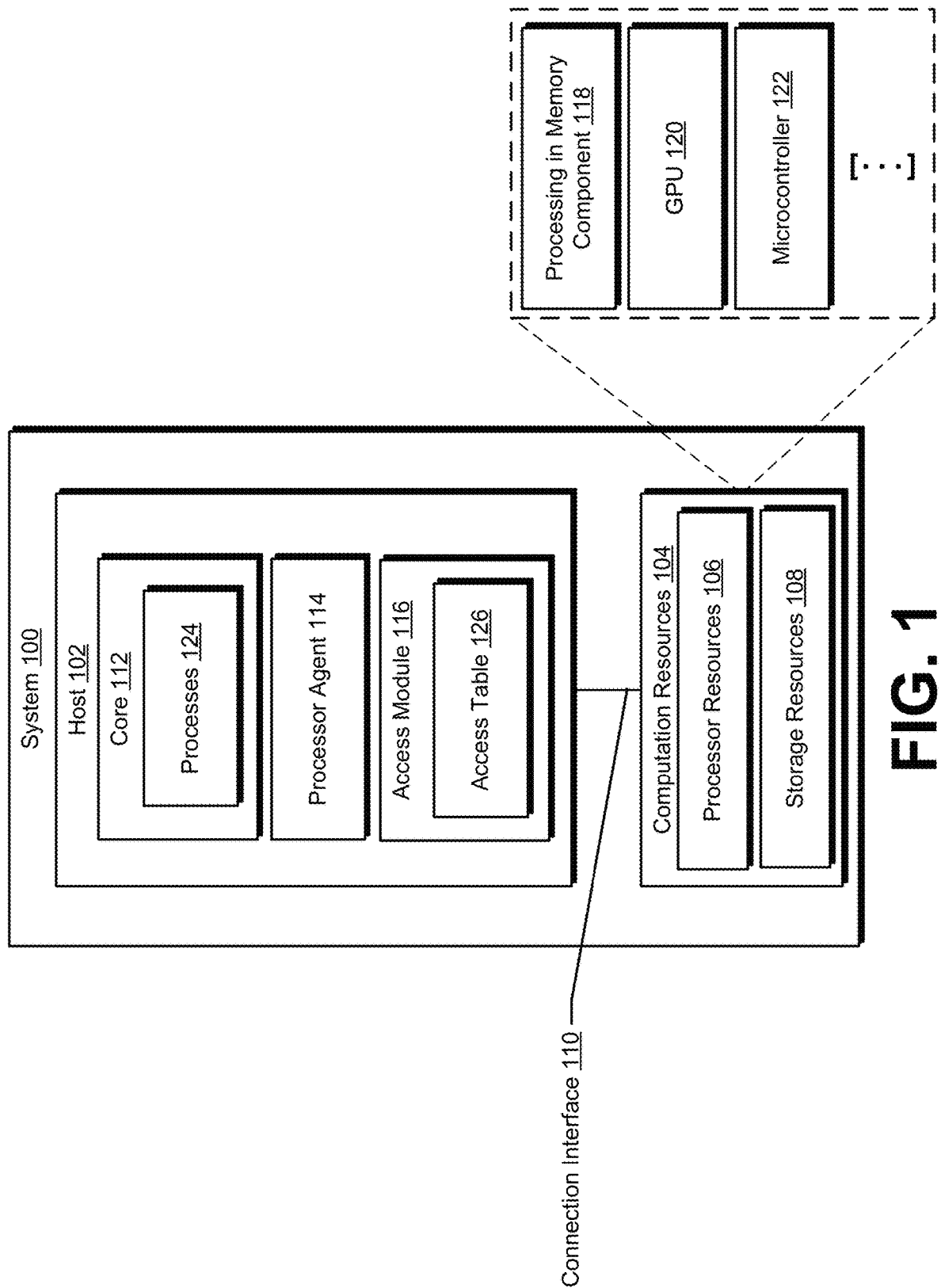
FIG. 1 is a block diagram of a non-limiting example system for resource access control in accordance with one or more implementations.

Some conventional implementations for computational resources (e.g., processing in memory (PIM) resources) provide distributed processing and storage resources that are accessible to various system components. Further, in some conventional implementations, a computational resource isolation mechanism is implemented that involves a driver (e.g., gatekeeper) assigning a resource (e.g., a processing and/or data storage resource) to a requesting process. For instance, the driver notifies the dispatching logic of a process that currently owns the resource, and the driver allows processor kernels (e.g., kernels that issue processor commands via processor-specific instruction set architecture (ISA)) belonging to that process to be dispatched.

However, dispatching logic (e.g., a packet processor, command processor, microcontroller, and/or a fixed function logic that is operable to dispatch work onto a processing engine) typically relies on a compiler to annotate the resource requirements of a kernel. Thus, if the kernel has a processor-specific ISA instruction, the compiler may annotate (e.g., in the kernel header and/or elsewhere) that the kernel requests a resource. The dispatching logic then compares the process identifier of the kernel to the resource-owner process identifier to determine if the dispatching process has resource ownership (e.g., processor ownership), such as to attempt to ensure process isolation. However, to attempt gain control of the resource, a malicious user may modify the compiler and annotate a processor kernel with processor-specific ISA instructions as a regular kernel, thus attempting to evade a resource and/or process isolation check at the dispatcher. This violation of process isolation can lead to security and validity vulnerabilities.

To solve these problems, resource access control is described. The described techniques, for example, enable a runtime check and/or a static pre-launch dispatcher check on computation tasks (e.g., processing tasks, data storage tasks, etc.) seeking access to computational resources (e.g., processor resources, data storage resources, etc.), such as to avoid the above-mentioned potential security violations. For instance, consider that a process (e.g., an application process, a system process, etc.) executing on a processor has an execution context that describes various system state information pertaining to the process. Accordingly, in implementations a resource indicator (e.g., a resource bit) is included in the execution context to indicate that the process has permission to access a computation resource. The resource indicator, for instance, is set in the execution context by dispatching logic for processes that have the resource ownership as indicated by a gatekeeper and/or driver, and a kernel that launched execution of the process has correctly identified its resource parameters for access to the resource. Accordingly, when an instruction that seeks access to a particular resource is executed, the resource indicator corresponding to that resource is checked to see if the permission exists. Alternatively or additionally, an access table is implemented which identifies processes that are permitted and/or not permitted to access the computation resource.

Accordingly, if an execution context for the instruction is associated with a valid resource indicator and/or the instruction is identified in a table as being permitted to access the computation resource, the instruction is permitted to access the resource, e.g., to be executed by a processor resource to generate a processing output. However, if the instruction is not associated with a valid resource indicator in an associated execution context and/or is not identified in a table as being permitted to access the computation resource, the instruction is denied access to the computation resource. An exception and/or error, for instance, is triggered that indicates that the instruction is denied access to the computation resource. In implementations, this indicates that the instruction was generated by a malicious process and/or a bug.

Accordingly, unlike conventional systems, implementations described herein enable access to computational resources to be controlled, such as to prevent malicious and/or faulty processes from accessing computational resources.

In some aspects, the techniques described herein relate to a system including: at least one processor; and computer-executable instructions that are executable by the at least one processor to: receive an instruction to perform a computation task by a computation resource; and process the instruction based at least in part on whether an execution context for the instruction includes a resource indicator associated with permission to access the computation resource to perform the computation task.

In some aspects, the techniques described herein relate to a system, wherein the instruction is directed to a processing in memory resource.

In some aspects, the techniques described herein relate to a system, wherein the resource indicator includes a resource bit.

In some aspects, the techniques described herein relate to a system, wherein the execution context includes a processing workgroup context.

In some aspects, the techniques described herein relate to a system, wherein to process the instruction, the computer-executable instructions are executable by the at least one processor to: compare an identifier for the instruction to an access table; and process the instruction based at least in part on whether the identifier for the instruction matches an entry in the access table for access to the computation resource.

In some aspects, the techniques described herein relate to a system, wherein the instruction is addressed to a subset of one or more processor units of the computation resource, and wherein the computer-executable instructions are executable by the at least one processor to process the instruction based on whether the instruction is identified as having permission to access the subset of one or more processor units.

In some aspects, the techniques described herein relate to a system, wherein the computer-executable instructions are executable by the at least one processor to determine whether the instruction is permitted to access the subset of one or more processor units based at least in part on a processor resource channel address associated with the instruction.

In some aspects, the techniques described herein relate to a system, wherein the computer-executable instructions are executable by the at least one processor to determine whether the instruction is permitted to access the subset of one or more processor units based at least in part on a resource partition identifier associated with the instruction.

In some aspects, the techniques described herein relate to a system, wherein in an event that the execution context for the instruction does not include the resource indicator, the computer-executable instructions are executable by the at least one processor to disallow the instruction from accessing the computation resource.

In some aspects, the techniques described herein relate to a system including: at least one processor; and computer-executable instructions that are executable by the at least one processor to: receive an instruction to perform a computation task by a computation resource; compare an identifier for the instruction to an access table; and process the instruction based at least in part on whether the identifier for the instruction matches an entry in the access table for access to a computation resource.

In some aspects, the techniques described herein relate to a system, wherein the computation resource includes a processing in memory resource.

In some aspects, the techniques described herein relate to a system, wherein the access table includes identifiers for different types of instructions that are permitted to access the computation resource.

In some aspects, the techniques described herein relate to a system, wherein: the access table identifies processor units of the computation resource that are permitted to be accessed by different types of instructions; the instruction is addressed to a subset of one or more processor units; and the computer-executable instructions are executable by the at least one processor to process the instruction based on whether the instruction is identified is in the access table as having permission to access the subset of one or more processor units.

In some aspects, the techniques described herein relate to a system, wherein the computer-executable instructions are executable by the at least one processor to determine whether the instruction is permitted to access the subset of one or more processor units based at least in part on a processor resource channel address associated with the instruction.

In some aspects, the techniques described herein relate to a system, wherein the computer-executable instructions are executable by the at least one processor to determine whether the instruction is permitted to access the subset of one or more processor units based at least in part on a resource partition identifier associated with the instruction.

In some aspects, the techniques described herein relate to a system, wherein in an event that an identifier for the instruction does not match an entry in the access table, the computer-executable instructions are executable by the at least one processor to disallow the instruction from accessing the computation resource.

In some aspects, the techniques described herein relate to a method including: receiving an instruction to perform a computation task by a computation resource; and processing the instruction based at least in part on whether an execution context for the instruction includes a resource indicator associated with permission to access the computation resource to perform the computation task.

In some aspects, the techniques described herein relate to a method, further including: comparing an identifier for the instruction to an access table; and processing the instruction based at least in part on whether the identifier for the instruction matches an entry in the access table for access to the computation resource.

In some aspects, the techniques described herein relate to a method, wherein the instruction is addressed to a subset of one or more processor units of the computation resource, and wherein processing the instruction includes determining whether to allow the instruction to access the processor resource based at least in part on whether the instruction is identified as having permission to access the subset of one or more processor units.

In some aspects, the techniques described herein relate to a method, wherein in an event that the execution context does not include the resource indicator, the method further includes disallowing the instruction from accessing the computation resource.

FIG. 1 is a block diagram of a non-limiting example system 100 for resource access control in accordance with one or more implementations. The system 100 includes a host 102 and computational resources 104 which are interconnected by a connection interface 110 to enable the host 102 to utilize the computational resources 104 for different computation tasks. The computational resources 104, for instance, include processor resources 106 that are operable to perform data processing tasks and storage resources 108 that are operable to perform data storage tasks. These examples of the computational resources 104 are non-limiting and the computational resources 104 are implementable to include a variety of different types and instances of computing resources.

The host 102 is configured to provide processing capability for an associated device such as a server, a desktop computing device, a portable computing device (e.g., a laptop, a smartphone, a tablet, etc.), and so forth. The host 102 includes a core 112, a processor agent 114, and an access module 116.

The host 102 is an electronic circuit that performs various operations on and/or using data, such as leveraging the computation resources 104. Examples of the host 102 include, but are not limited to, a central processing unit (CPU), a graphics processing unit (GPU), a field programmable gate array (FPGA), an accelerated processing unit (APU), a digital signal processor (DSP), etc. The core 112 is a processing unit that reads and executes instructions (e.g., of a program). Although one core 112 is depicted in the illustrated example, in at least some implementations the host 102 includes more than one core 112, e.g., the host 102 is a multi-core processor.

The computation resources 104 represents resources that are accessible by the host 102 to perform various computation tasks, such as data processing, data storage, etc. The computation resources 104 are implementable in various ways, such as a processing in memory (PIM) component 118, a GPU 120, a microcontroller 122, and so forth.

In implementations, the processing in memory component 118 is a device and/or system that is configured to store information as well as perform data processing, such as for use in a device, e.g., by the core 112 of the host 102 and/or by another device attached to the processing in memory component 118. In one or more implementations, the processing in memory component 118 includes semiconductor memory where data is stored within memory cells on one or more integrated circuits, as well as in-memory processors for performing data processing, such as on data stored by the processing in memory component 118. In at least one example, the processing in memory component 118 corresponds to and/or includes volatile memory, examples of which include random-access memory (RAM), dynamic random-access memory (DRAM), synchronous dynamic random-access memory (SDRAM), and static random-access memory (SRAM). Alternatively or in addition, the processing in memory component 118 corresponds to and/or includes non-volatile memory, examples of which include flash memory, read-only memory (ROM), programmable read-only memory (PROM), erasable programmable read-only memory (EPROM), and electronically erasable programmable read-only memory (EEPROM).

The processor agent 114 and the access module 116 represent functionalities for controlling various aspects of access to the computational resources 104. For instance, the processor agent 114 receives processing instructions from processes 124 executing on the core 112 for the computational resources 104 to perform various computation tasks. The processor agent 114 routes the instructions to the access module 116, and the access module 116 determines whether the instructions are permitted to access the computation resources 104. The access module 116, for instance, determines whether an execution context for the instructions includes a resource indicator that indicates that the instructions are permitted to access and/or invoke the requested computational resource 104. In at least one implementation the resource identifier is implemented as a resource bit. The resource bit, for instance, is implemented in conjunction with a workgroup context.

Alternatively or additionally the access module 116 maintains an access table 126 that includes entries for different processes and/or process types that are permitted to access the computational resources 104. The processor agent 114 and/or the access module 116, for instance, configure the access table 126 to identify different processes that are permitted to access the computational resources 104.

Figure 2:
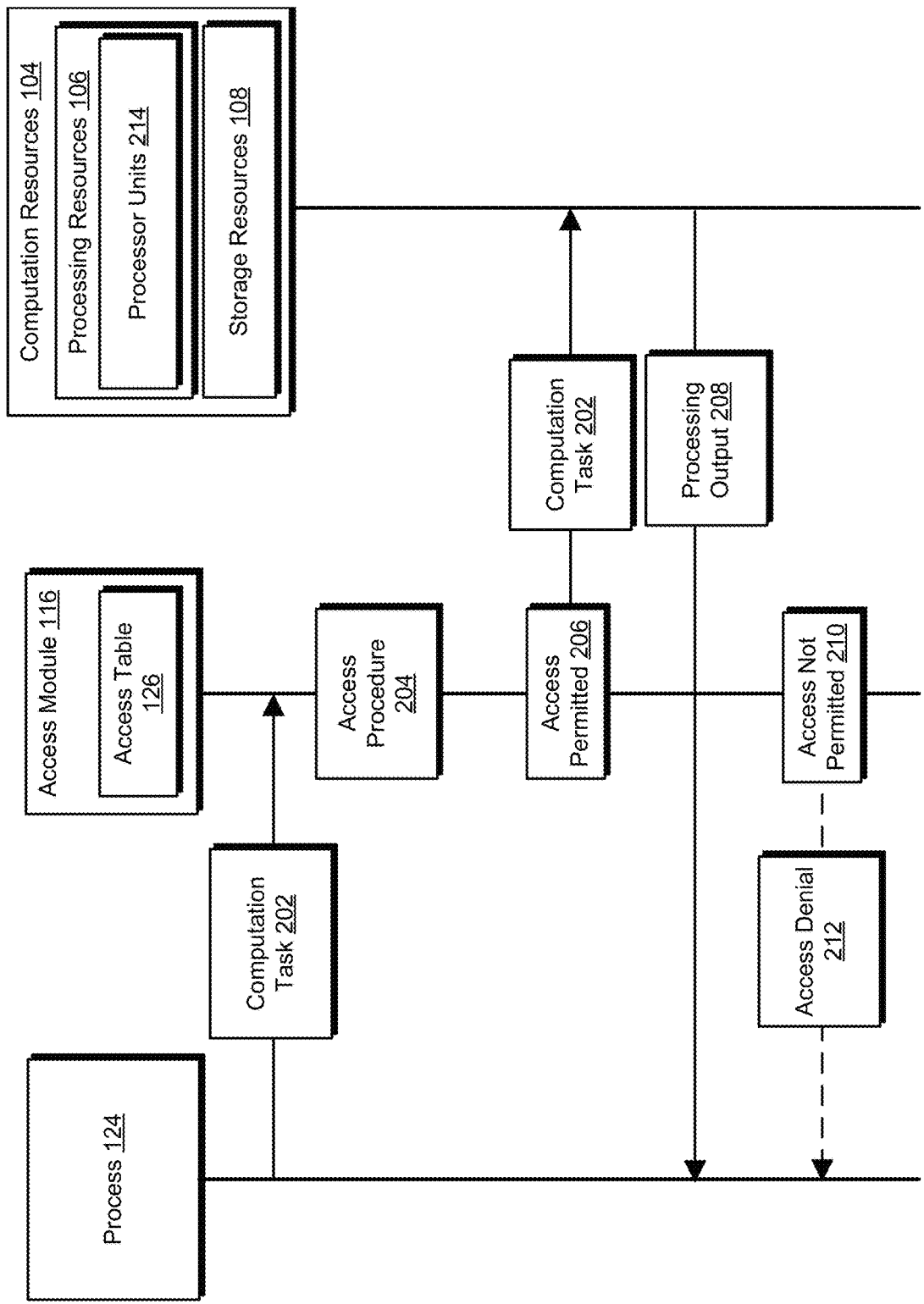
FIG. 2 depicts a non-limiting example operation scenario for resource access control in accordance with one or more implementations.

FIG. 2 depicts a non-limiting example operation scenario 200 for resource access control in accordance with one or more implementations. The scenario 200 includes a process 124 executing on the host 102. The process 124, for instance, represents an instance of the processes 124 introduced above, such as an application process, a system process, etc. In implementations, the process 124 represents an ISA instruction.

Further to the scenario 200, the process 124 issues a computation task 202 directed to the computational resources 104. The computational task 202, for instance, includes a data processing instruction and/or set of data processing instructions, a data storage instruction, etc. In at least one implementation the computational task 202 is associated with a wavefront context of a parallel processor, such as a wavefront of a workgroup of processing work items, e.g., processing tasks.

The access module 116 receives the computational task 202 and executes an access procedure 204 to determine whether the computation task 202 is permitted to access the computational resources 104. For instance, the access module 116 determines whether an execution context associated with the computation task 202 includes a resource indicator associated with permission to access a computational resource 104 to perform the computation task 202. In at least one implementation, as part of the access procedure 204, the access module 116 determines whether the computation task 202 is identified by a resource bit as being permitted to access a computation resource 104. Alternatively or additionally, as part of the access procedure 204, the access module 116 determines whether the process 124 and/or the computation task 202 are identified in the access table 126 as being permitted to access a computation resource 104. The access table 126, for instance, identifies different processes 124 and/or processing tasks that are permitted or not permitted to access the computation resources 104.

Further to the scenario 200, if the access module 116 determines at 206 that the computation task 202 is permitted to access a computation resource 104, the access module 116 enables the computation task 202 to be communicated to a computation resource 104. The computation resource 104 executes the computation task 202 and generates a processing output 208 of the computation task 202. The processing output 208, for instance, is utilized by and/or output by the process 124.

Alternatively, if the access module 116 determines at 210 that access by the computation task 202 to a computation resource 104 is not permitted, the access module 116 communicates an access denial 212 to the process 124. The access module 116, for instance, determines that an execution context for the computation task 202 does not include a valid resource indicator (e.g., resource bit) for allowing the computation task 202 to access the computation resource 104 and/or that the computation task 202 is not identified in the access table 126 as being permitted to access the computation resource 104. The access module 116, for instance, prevents the computation task 202 from accessing the computation resource 104. The access denial 212 is implementable in various ways, such as a processing fault, a processing exception, and so forth.

In at least one implementation the processor resources 106 include different processor units 214, such as processing in memory units, processor partitions, and so forth. Accordingly, in implementations as part of the access procedure 204, the access module 116 determines that the computation task 202 is addressed to a particular subset of processor units 214 and determines whether the computation task 202 is permitted to access the particular subset of processor units 214. In at least one implementation the computation task 202 is associated with a resource partition identifier that specifies which processing units 214 are allocated to a compute kernel associated with the computation task 202. The computation task 202, for instance, identifies a subset of processor units 214, such as part of a thread context where the processor units 214 are partitionable across multiple compute kernels.

In at least one implementation the processor units 214 are each identified by a particular channel identifier. Thus, as part of the access procedure 204, the access module 116 determines whether one or more channel addresses of the computation task 202 match one or more permitted channel identifiers for access of the computation task 202 to the computational resources 104, e.g., as indicated by the access table 126. In implementations, checking channel addresses is implementable in various ways, such as after the address generation stage and/or after a translation lookaside buffer translation, e.g., where channel identification determination involves a physical address.

Figure 3:
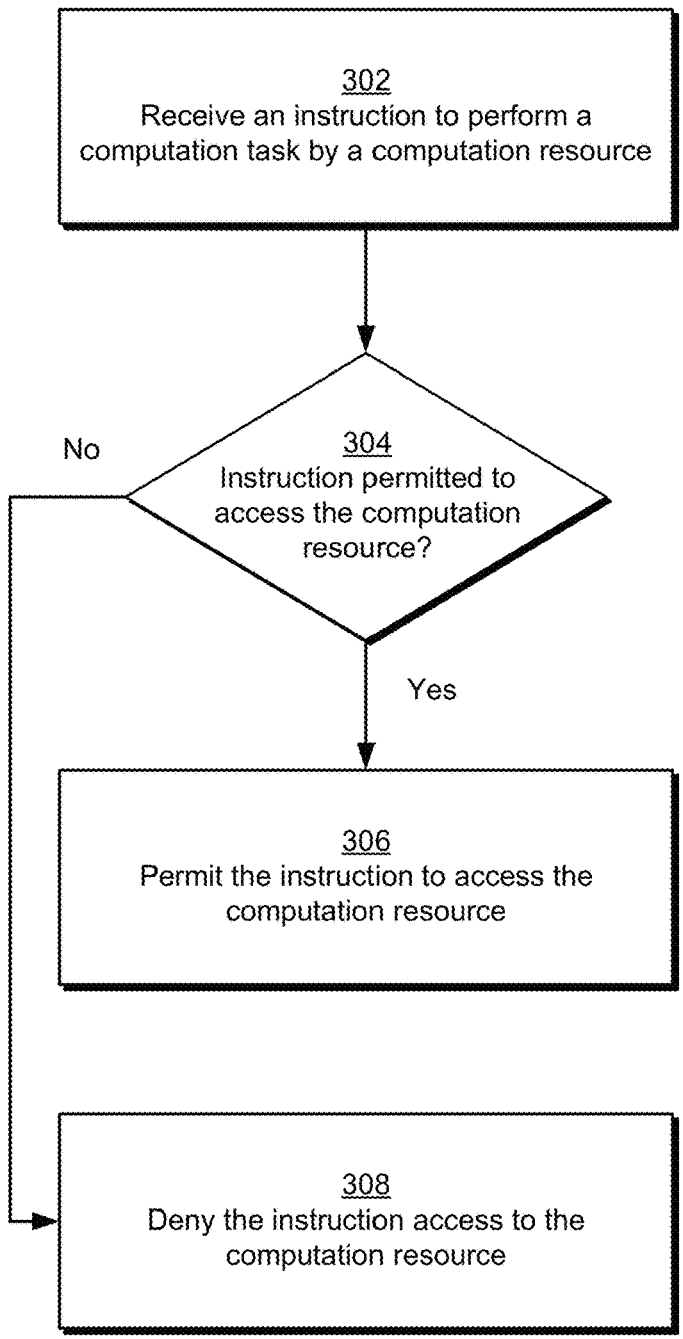
FIG. 3 illustrates a flow diagram depicting a procedure in an example implementation of resource access control in accordance with one or more implementations.

FIG. 3 illustrates a flow diagram depicting a procedure 300 in an example implementation of resource access control in accordance with one or more implementations. Aspects of the procedure 300, for example, are implemented in the context of the system 100 and/or the scenario 200.

An instruction is received to perform a computation task by a computation resource (block 302). By way of example, the core 112 issues an instruction for a processor resource 106 and/or subset of processor units 214 of the processor resource 106 to perform one or more processing tasks. The access module 116 receives the instruction and processes the instruction. It is determined whether the instruction is permitted to access the computation resource (block 304). The access module 116, for instance, determines whether an execution context for the instruction includes a resource indicator indicating that the instruction is permitted to access the computation resource 104. For example, the access module 116 checks whether an execution context for the instruction includes a resource bit set to indicate access to the computation resource 104. Alternatively or additionally, the access module 116 determines whether the instruction and/or an associated process 124 is identified in the access table 126 as being permitted to access the computation resource 104. In at least one implementation the instruction identifies a subset of processor units 214 to be used to perform the processing task, and thus the access module 116 determines (e.g., based on the access table 126) whether the instruction is permitted to access the indicated subset of processor units 214.

If the instruction is permitted to access the computation resource ("Yes"), the instruction is permitted to access the computation resource (block 306). For example, the access module 116 determines that an execution context for the instruction includes a resource indicator indicating allowed access to the computation resource 104 and/or that the access table 126 indicates that the instruction and/or an associated process 124 is permitted to access the computation resource 104, e.g., a processor resource 106 and/or a storage resource 108. The access module 116, for instance, allows the instruction to be forwarded to the computation resource 104 and/or subset of processor units 214.

If the instruction is not permitted to access the computation resource ("No"), the instruction is denied access to the computation resource (block 308). For example, the access module 116 determines that an execution context for the instruction does not include a resource indicator indicating allowed access to the computation resource 104 and/or that the access table 126 does not indicate that the instruction and/or an associated process 124 is permitted to access the computation resource 104. Thus, the instruction is disallowed access to the computation resource.

Figure 4:
FIG. 4 illustrates a flow diagram depicting a procedure in an example implementation of resource access control in accordance with one or more implementations.

FIG. 4 illustrates a flow diagram depicting a procedure 400 in an example implementation of resource access control in accordance with one or more implementations. Aspects of the procedure 300, for example, are implemented in the context of the system 100 and/or the scenario 200. In at least one implementation the procedure 400 represents an implementation of block 304 of the procedure 300.

An identifier for an instruction is compared to an access table (block 402). The access module 116, for instance, compares an identifier for an instruction to perform a processing task to the access table 126. The instruction is processed based at least in part on whether the identifier for the instruction matches an entry in the access table for access to the computation resource (block 404). For example, if the instruction includes an identifier that matches an identifier in the access table 126 that is indicated as permitted to access a computation resource 104, the access module 116 allows the instruction to access the computation resource 104 to perform an associated computation task.

However, if the instruction does not include an identifier that matches an identifier in the access table 126 that is indicated as permitted to access the computation resource 104, the access module 116 denies the instruction access to the computation resource 104. The access module 116, for instance, triggers an execution fault, an exception, an error, etc.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, for example, the host 102 and/or the computation resources 104) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:
1. A system comprising:
   at least one processor including an accelerator processing unit that executes a compute kernel and is different from a central processing unit; and
   computer-executable instructions that are executable by the accelerator processing unit to:

receive an instruction to perform a computation task of the compute kernel by accessing a computation resource from the compute kernel; and process the instruction based at least in part on whether an execution context for the instruction includes a resource indicator associated with permission for the compute kernel to access the computation resource to perform the computation task.

2. The system of claim 1, wherein the computation resource comprises a processing in memory resource.

3. The system of claim 2, wherein the resource indicator comprises a resource bit of the processing in memory resource.

4. The system of claim 3, wherein the execution context comprises a processing workgroup context of the processing in memory resource.

5. The system of claim 1, wherein to process the instruction, the computer-executable instructions are executable by the at least one processor to:

compare an identifier for the instruction to an access table that indicates whether the compute kernel is permitted to access the computation resource; and process the instruction based at least in part on whether the identifier for the instruction matches an entry in the access table for the compute kernel to access the computation resource.

6. The system of claim 1, wherein the instruction is addressed to a subset of one or more processor units of the computation resource, and wherein the computer-executable instructions are executable by the at least one processor to process the instruction based on whether the compute kernel is identified as having permission to access the subset of one or more processor units.

7. The system of claim 6, wherein the computer-executable instructions are executable by the at least one processor to determine whether the compute kernel is permitted to access the subset of one or more processor units based at least in part on a processor resource channel address associated with the instruction.

8. The system of claim 6, wherein the computer-executable instructions are executable by the at least one processor to determine whether the compute kernel is permitted to access the subset of one or more processor units based at least in part on a resource partition identifier associated with the instruction.

9. The system of claim 1, wherein in an event that the execution context for the instruction does not include the resource indicator, the computer-executable instructions are executable by the at least one processor to disallow the instruction from accessing the computation resource.

10. A system comprising:
at least one processor; and
computer-executable instructions that are executable by the at least one processor to:
receive an instruction to perform a computation task of a compute kernel by accessing a computation resource from the compute kernel;
compare an identifier for the instruction to an access table that indicates whether the compute kernel is permitted to access the computation resource; and
process the instruction based at least in part on whether the identifier for the instruction matches an entry in the access table for the compute kernel to access the computation resource.

11. The system of claim 10, wherein the computation resource comprises a processing in memory resource.

12. The system of claim 10, wherein the access table comprises identifiers for different compute kernels that are permitted to access the computation resource, and the compute kernel is one of the different compute kernels.

13. The system of claim 12, wherein:
the access table identifies processor units of the computation resource that are permitted to be accessed by the different compute kernels;
the instruction is addressed to a subset of one or more processor units; and
the computer-executable instructions are executable by the at least one processor to process the instruction based on whether the instruction is identified in the access table as having permission for the compute kernel to access the subset of one or more processor units.

14. The system of claim 13, wherein the computer-executable instructions are executable by the at least one processor to determine whether the instruction is permitted to access the subset of one or more processor units based at least in part on a processor resource channel address associated with the compute kernel.

15. The system of claim 13, wherein the computer-executable instructions are executable by the at least one processor to determine whether the instruction is permitted to access the subset of one or more processor units based at least in part on a resource partition identifier associated with the compute kernel.

16. The system of claim 10, wherein in an event that the identifier for the instruction does not match an entry in the access table, the computer-executable instructions are executable by the at least one processor to disallow the compute kernel from accessing the computation resource.

17. A method comprising:
executing, by an accelerator processing unit that is different from a central processing unit, a compute kernel;
receiving, by the accelerator processing unit, an instruction to perform a computation task of the compute kernel by accessing a computation resource from the compute kernel; and
processing, by the accelerator processing unit, the instruction based at least in part on whether an execution context for the instruction includes a resource indicator associated with permission for the compute kernel to access the computation resource to perform the computation task.

18. The method of claim 17, further comprising:
comparing an identifier for the instruction to an access table that indicates whether the compute kernel is permitted to access the computation resource; and
processing the instruction based at least in part on whether the identifier for the instruction matches an entry in the access table for the compute kernel to access the computation resource.

19. The method of claim 17, wherein the instruction is addressed to a subset of one or more processor units of the computation resource, and wherein processing the instruction comprises determining whether to allow the instruction to access the computation resource based at least in part on whether the compute kernel is identified as having permission to access the subset of one or more processor units, and wherein in an event that the execution context does not include the resource indicator, the method further comprises disallowing the instruction from accessing the computation resource.

20. The system of claim 1, wherein the compute kernel issues commands through the instruction according to a processor-specific instruction set architecture.

* * * * *